Dec. 7, 1943.    H. CHASKIN    2,336,164
LOCK NUT
Filed Dec. 31, 1941    2 Sheets-Sheet 1

INVENTOR
Harold Chaskin
ATTORNEY

Dec. 7, 1943.  H. CHASKIN  2,336,164
LOCK NUT
Filed Dec. 31, 1941  2 Sheets-Sheet 2

INVENTOR.
Harold Chaskin
BY
ATTORNEY

Patented Dec. 7, 1943

2,336,164

UNITED STATES PATENT OFFICE 2,336,164

LOCK NUT

Harold Chaskin, New York, N. Y.

Application December 31, 1941, Serial No. 425,043

2 Claims. (Cl. 151—17)

This invention relates generally to lock nut devices and more particularly to lock nut assemblies for fastening engine parts together.

An object of my invention is to prevent unscrewing of the nut by vibration or the like.

Another object is to eliminate rattling and vibration.

Another object is to provide a device of this kind with a plurality of nut members coacting with each other in such a manner that the tendency of one nut to unscrew will tend to tighten the other.

Another object is to provide a nut of this kind that can be readily adjusted.

Another object is to provide a lock nut that is durable and sturdy and positive in action.

Another object is to eliminate the necessity of friction to develop and maintain a grip.

My improved lock nut assembly is especially adapted for fastening engine or other metal parts together and is illustrated as fastening a cylinder block head A to the cylinder block B of an internal combustion engine. The cylinder block head A is provided with openings which are adapted to register with screw threaded openings in the cylinder block B when the block head is in position. Generally a gasket C having openings registering with the block head and block openings is positioned between the head and block to prevent leakage.

Figure 1:
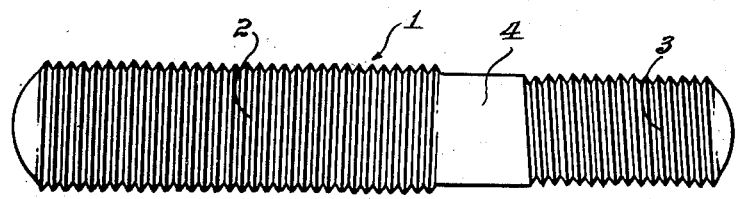
Fig. 1 is a side view of a stud used with my improved lock nut assembly.

In Fig. 1 is shown a stud 1 having its shank provided with a screw threaded portion 2 at one end and a screw threaded portion 3 at the other end, with a plain or unthreaded portion 4 therebetween. The threaded portion 2 has left hand threads and the portion 3 has oppositely disposed right hand threads. The stud is to be inserted into and through the aligned openings of the engine parts to be fastened together and usually a plurality of them are used particularly in fastening a cylinder block head to the cylinder block. The threaded portion 2 is threaded into the screw threaded opening in the cylinder block and projects through the gasket and block head.

Figure 2:
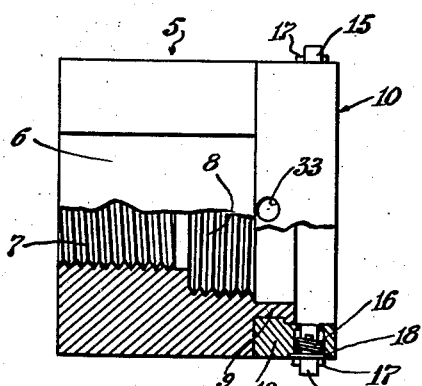
Fig. 2 is a side view of one of the nut devices of my improved lock nut assembly, with the bottom part shown in section.
Figure 3:
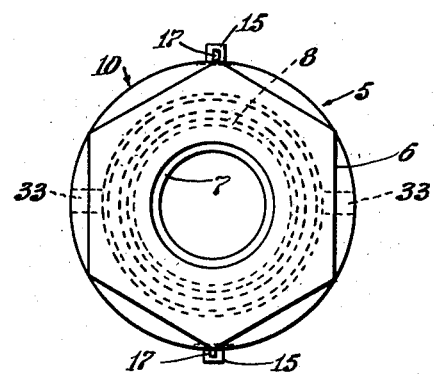
Fig. 3 is a view of the nut shown in Fig. 2 looking from the left.
Figure 4:
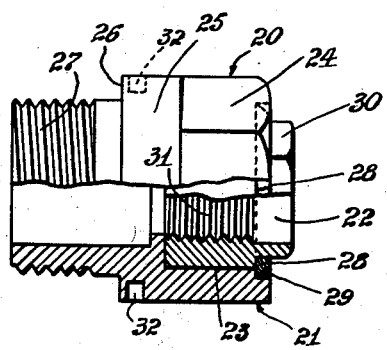
Fig. 4 is a view similar to Fig. 2 of another nut device adapted to be inserted into the nut device of Fig. 2.
Figure 5:
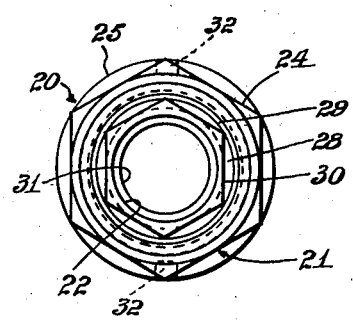
Fig. 5 is a view of the nut device shown in Fig. 4 looking from the right.
Figure 6:
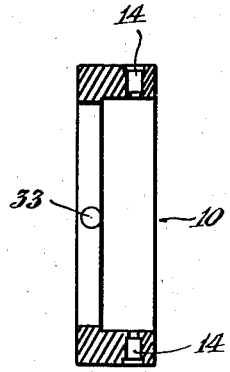
Fig. 6 is a cross sectional detail view of the collar of the nut shown in Fig. 2.
Figure 7:
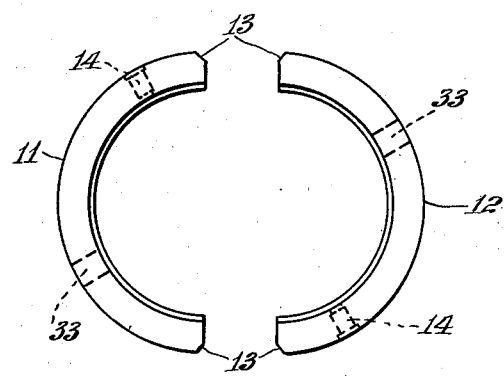
Fig. 7 is a plan view of the collar member before it is assembled.
Figure 8:
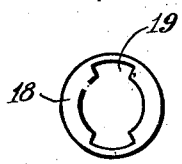
Fig. 8 is an enlarged end view of the part for preventing the pin from becoming displaced.
Figure 10:
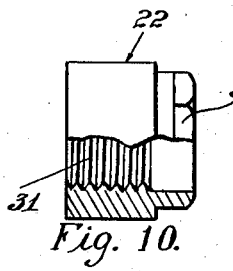
Fig. 10 is a view similar to Fig. 2 of one of the nut members shown in Fig. 4.
Figures 9, 11:
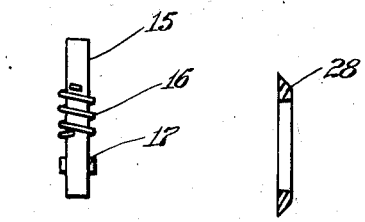
Fig. 9 is a side elevation of the pin on a smaller scale.
Fig. 11 is a cross sectional detail view of the ring or washer in the face of one of the nut members of Fig. 4.
Figure 12:
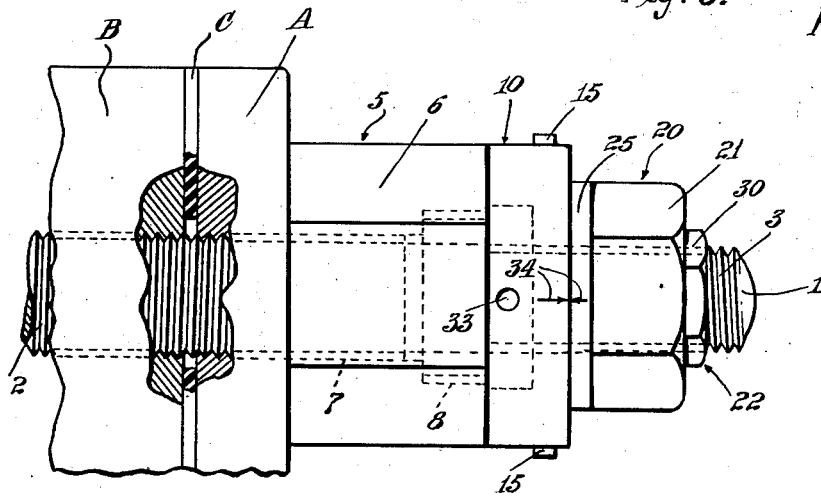
Fig. 12 is a side view and partial section of my improved lock nut assembly in position to fasten the cylinder block head on to the cylinder block of an internal combustion engine.

The improved nut assembly includes a nut member 5 which may have a hexagonal outer surface 6 for receiving a tool for turning purposes. The bore of this nut has a screw threaded portion 7 at one end with left hand screw threads to coact with the threads 2 of the stud, and a threaded portion 8 of larger diameter with right hand threads. The bore has a short unthreaded portion between the threaded portions. The body of the nut has a reduced neck portion 9 around which is fastened a collar 10. In mounting or assembling this collar on the neck, the sections 11 and 12 of the collar (see Fig. 7) are positioned around the neck portion 9 and welded to each other at the slanting surfaces 13 formed on the meeting edges of said sections. Collar 10 is formed with a pair of oppositely disposed openings 14, in each of which is a pin 15 with a coil spring 16 around it and having one of its ends anchored thereto. A nipple or projection 17 is formed near one end of the pin. Opening 14 is closed at its outer end by a plate 18 which is provided with a key-hole opening 19. Spring 16 engages plate 18 and urges pin 15 inwardly. When it is desired to hold the pin in extracted position so that its inner end is outwardly of the floor of the opening 14 and clear of the bore of the collar (see Fig. 2), the pin is pulled outwardly of the opening and given a half turn so that the nipple or projection engages the surface of the plate.

Another nut device or unit 20 is adapted to be inserted or nested into the nut member 5. This device 20 comprises an outer nut member 21 and an inner nut member 22. The outer nut 21 comprises a body having a recess or compartment 23 in its face. The outer surface of the body may have a hexagonal portion 24 and a smooth portion 25 and has a rearward extension of smaller diameter than the rest of the body forming a shoulder 26. The rearward extension is formed with exterior right hand screw threads 27 to coact with the interior threads 8 of nut 5.

The inner nut 22 is nested in the recess or compartment 23 of the nut 21 and is free to rotate in said recess. It is held in place by a ring member 28 which may be bevel welded to the face of nut 21 as indicated at 29 or may be fastened thereto in any suitable manner. Nut 22 has a body with a cylindrical outer surface to permit it to rotate in the recess and may be provided with a hexagonal outer portion 30 to receive a tool for turning. The bore of nut 22 has right hand screw threads 31 to coact with the exterior threads on the portion 3 of the stud. The cylindrical portion of the nut body is provided with opposite slots 32 for receiving the pins 15 of nut 5.

In using my improved nut assembly, the stud 1 is inserted through the aligned openings in the block head and gasket and threaded into the threaded opening in the cylinder block.

The nut member 5 with its pins 15 in extracted position, is slipped over the portions 3 and 4 of the stud until its thread portion 7 engages the threads 2 on the stud when it is rotated on the portion 2 until the unthreaded portion of the nut is over the unthreaded portion 4 of the stud.

The nut unit 29 is then slipped over the portion 3 of the stud until the threads 31 of nut 22 engage the threads 3 of the stud when by means of the hexagonal portion 30 the nut 22 is turned on the threads 3 but in a direction different from the turning of the nut 5 on threads 2. As the unit 29 advances axially on the threaded portion 3, it moves freely until the thread portion 27 of nut 21 is about to engage with the thread portion 8 of nut 5 when it will cease to advance unless the threads 27 take a bite of or are in position to mate with threads 8. If not in position to mate with threads 8, a slight turn of nut 21 relative to nut 22 will bring the threads 27 into mating position. It will be noted that the nut member 22 is free to rotate within nut 21 and also has a little play therein for this purpose. Further turning of the nut 21 will bring the shoulder 26 against neck 9 and the slots 32 of said nut into alignment with the openings 14 of collar 10 and adjustment or rotation of the collar 10 by means of a tool inserted into the slots 33, if necessary, will bring said slots and openings into register. When thus registered, the pins 15 are given a half turn and snapped into the slots 32 to lock the parts together. Arrow marks 34 may be provided on the collar 10 and nut 21 to indicate when the slots 32 and openings 14 are in register.

It will be noted that by reason of the fact that the engaging threads of nut members 20 and 22 are opposite in direction to those of nut 5 any tendency of the nut member 22 or unit 29 to turn in a direction to loosen will cause the nut 5 to tend to turn in a direction to fasten itself more tightly on the stud.

I claim:

1. The combination with a fastening device having two spaced threaded portions with oppositely inclined threads, of a nut unit including a nut member having internally threaded portions, the threads of one portion being inclined in one direction and adapted to engage the threads on one portion of the fastening device and the threads of the other portion being inclined in the opposite direction; a rotatable collar on one end of said nut member; another nut member nested in said first nut member and including an externally threaded portion adapted to engage the second named threads of the first nut member and a recessed face portion; and another nut member swively and permanently nested in said recessed face portion and having an internally screw threaded portion adapted to engage the threads of the other portion of the fastening device, all of said nut members having a slight relative play between each other to permit movement to their respective initial mating positions and means carried by the collar and adapted to coact with the second named nut member for holding said first and second named nut members in fixed relative positions.

2. A safety lock nut unit to be used on a stud having two externally threaded portions with oppositely inclined threads comprising a nut member having spaced internally screw threaded portions, the threads of one portion being inclined in one direction and adapted to engage one of the threaded portions of the stud and the threads of the other portion being inclined in an opposite direction; a rotatable collar on one end of said nut member; another nut member having an externally screw threaded portion adapted to engage said internal screw threads inclined in one direction and having a recessed face portion and a slot in its exterior surface; another nut member swively and permanently nested in said recessed face portion and having an internally screw threaded portion adapted to engage the other threaded portion of the stud; all of said nut members having a slight relative play between each other to permit movement to their respective initial mating positions; and a spring pressed pin carried by said rotatable collar and adapted to be inserted into said slot for holding the first and second named nut members in fixed relative positions.

HAROLD CHASKIN.